United States Patent Office 3,749,714
Patented July 31, 1973

3,749,714
NOVEL ASYMMETRIC CARBOCYANINE DYES
Akira Sato, Tadashi Ikeda, Yoshiyuki Nakazawa, Yashuharu Nakamura, and Haruo Takei, Kanagawa, Japan, assignors to Fuji Photo Film Co., Ltd., Kanagawa, Japan
No Drawing. Filed May 27, 1970, Ser. No. 41,115
Claims priority, application Japan, May 28, 1969, 44/41,466
Int. Cl. C09b 23/06
U.S. Cl. 260—240.6    1 Claim

ABSTRACT OF THE DISCLOSURE

A silver halide emulsion, containing a sensitizing dye having the general formula

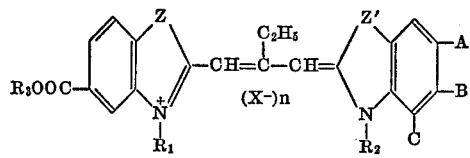

wherein $R_1$, $R_2$, $R_3$, A, B, C, Z, Z', X and $n$ are described hereinafter, having increased red sensitivity is disclosed.

BACKGROUND OF THE INVENTION (1) Field of the invention

This invention relates to a silver halide photographic emulsion containing a new sensitizing dye, in particular, having a high red sensitivity.

(2) Description of the prior art

It is well known that the addition of a sensitizing dye to a silver halide emulsion in making a photographic emulsion spectrally sensitizes the silver halide emulsion and enlarges its sensitive wavelength region. In color sensitive materials, in particular, it is necessary to sensitize spectrally each basic layer of the blue-sensitive layer, the green-sensitive layer and the red-sensitive layer to give optimum color reproduction. Since the spectral sensitivity is often affected by the chemical structure of a sensitizing dye, selection of a sensitizing dye to be used is very important to sensitize in a desired spectral sensitization wavelength region.

It is a principal object of the invention to provide a silver halide photographic emulsion having a high red sensitivity.

SUMMARY OF THE INVENTION

The object of the invention can be accomplished by incorporating in a silver halide emulsion a new sensitizing dye represented by the following general formula

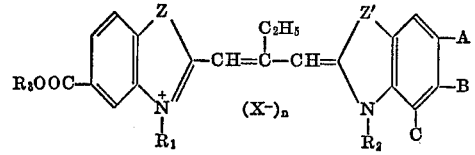

in which Z and Z' each represents a sulfur atom and a selenium atom, $R_3$ represents a hydrogen atom or a lower alkyl group, such as methyl or an ethyl group, A represents a hydrogen atom or a lower alkyl group, such as a methyl or an ethyl group, B represents a hydrogen atom, a halogen atom, such as a chlorine or a bromine atom, a lower alkyl group, such as a methyl or an ethyl group, an alkoxy group, such as a methoxy or an ethoxy group or a hydroxyl group, C represents a hydrogen atom, B and C may form a benzene nucleus, and when A is a lower alkyl group and when C is a hydrogen atom, B represents a lower alkyl group, a hydroxyl group, or an alkoxyl group, and when A is a hydrogen atom and when C is a hydrogen atom, B represents a hydrogen atom, a halogen atom, an alkoxy group and a hydroxy group, $R_1$ and $R_2$ represent an ethyl, an n-propyl, a vinyl-methyl, a γ-sulfopropyl, a γ-sulfobutyl and a δ-sulfobutyl group, at least one of $R_1$ and $R_2$ representing a γ-sulfopropyl, a γ-sulfobutyl or a δ-sulfobutyl group when $R_3$ is a lower alkyl group, X represents an anion used in sensitizing dyes, such as a halogen ion, perchlorate, thiocyanate, p-toluenesulfonate, benzenesulfonate, methylsulfate, ethylsulfate, and the like, and $n$ represents 0 to 1, and in particular is 0 in the case of intramolecular salt.

DETAILED DESCRIPTION OF THE INVENTION

Asymmetrical sensitizing dyes corresponding to the sensitizing dye represented by the above described general formula wherein $R_1$, $R_2$ and $R_3$ are substituted by alkyl groups are disclosed in U.S. Pat. 2,647,051, but as is evident from Table 4, hereinafter, with the new sensitizing dye according to the invention in comparison with these known dyes of this invention. The actions or effects of both are completely different.

The sensitizing dye used in the invention can readily be synthesized in a conventional manner known to those skilled in the art, for example, as disclosed in U.S. Pats. 2,503,776 and 2,647,051.

A typical synthesis method, for example, for preparing the sensitizing dye, Dye No. 22 is as follows:

1 g. of 3-ethyl-5-methyl-2-thiopropionylmethylenebenzothiazoline is heated at 150° C. for 1.5 hours with 950 mg. of ethyl p-toluenesulfonate and cooled. The reaction mixture is adequately washed with ethyl ether, dissolved in 150 ml. of ethanol to which 1.25 g. of anhydro-5-carbomethoxy-2-methyl-3-(γ-sulfopropyl)-benzothiazolium hydroxide is added, heated with refluxing for 2 hours in the presence of 3.5 ml. of triethylamine and then the solvent is distilled off. A small quantity of ethyl ether is added thereto to precipitate a crystal followed by filtering, washing with a mixed solution of isopropanol-ethyl ether and recrystallizing from a mixed solution of methanol-chloroform to obtain 550 mg. of the dye. M.P. 296° C., λ MeOH max. 557.5 mμ.

The other sensitizing dyes used in the invention can be synthesized in a manner similar to that described above.

Typical examples of the sensitizing dye used in the invention are shown in Table 1. The sensitizing dye of the invention is not to be limited thereby.

TABLE 1

General formula

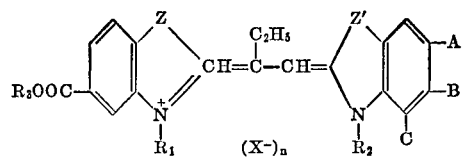

| Dye No. | Z | Z' | $R_1$ | $R_2$ | $R_3$ | X | A | B | C | MeOH λ max | M.P. (°C) |
|---|---|---|---|---|---|---|---|---|---|---|---|
| 1 | S | S | $C_2H_5$ | $C_2H_5$ | H | I | H | $CH_3$ | H | 553 | >300 |
| 2 | S | S | $(CH_2)_3-SO_3^-$ | $C_2H_5$ | H |  | H | $CH_3$ | H | 554.5 | 293 |
| 3 | S | S | $C_2H_5$ | $C_2H_5$ | H | I | H | $OCH_3$ | H | 558.5 | 234 |
| 4 | S | S | $(CH_2)_3-SO_3^-$ | $C_2H_5$ | H |  | H | $OCH_3$ | H | 559 | >300 |
| 5 | S | S | $C_2H_5$ | $C_2H_5$ | H | I | H | Cl | H | 553 | 210 |
| 6 | S | S | $(CH_2)_3-SO_3^-$ | $C_2H_5$ | H |  | H | Cl | H | 555.5 | >300 |
| 7 | S | S | $(CH_2)_3-SO_3^-$ | $C_2H_5$ | H |  | H | H | H | 553 | 302 |
| 8 | S | S | $C_2H_5$ | $C_2H_5$ | H | PTS | H | OH | H | 558.5 | 234 |
| 9 | S | S | $(CH_2)_3-SO_3$ | $C_2H_5$ | H |  | H | OH | H | 558 | 290 |
| 10 | S | S | $C_2H_5$ | $C_2H_5$ | H | PTS | H | —{CH=CH}$_2$— |  | 565.5 | 298.5 |
| 11 | S | S | $(CH_2)_3-SO_3^-$ | $C_2H_5$ | H |  | H | Br | H | 555 | >300 |
| 12 | S | Se | $(CH_2)_3-SO_3^-$ | $C_2H_5$ | H |  | H | Cl | H | 561.5 | >300 |
| 13 | S | Se | $C_2H_5$ | $C_2H_5$ | H | I | H | Cl | H | 562.5 | 268 |
| 14 | S | S | $(CH_2)_3-SO_3^-$ | $C_3H_7$ | H |  | H | Cl | H | 556 | >300 |
| 15 | S | S | $C_2H_5$ | $(CH_2)_3-SO_3^-$ | H |  | $CH_3$ | $CH_3$ | H | 570 | >300 |
| 16 | S | S | $C_2H_5$ | $(CH_2)_3-SO_3^-$ | H |  | $CH_3$ | $OC_2H_5$ | H | 572 | >300 |
| 17 | S | S | $C_2H_5$ | $(CH_2)_3-SO_3^-$ | H |  | $CH_3$ | OH | H | 575 | 275 |
| 18 | S | S | $(CH_2)_4-SO_3^-$ | $C_2H_5$ | H |  | H | $CH_3$ | H | 556 | >300 |
| 19 | S | S | $CH_2CH_2-CH-CH_3$ $\mid$ $SO_3^-$ | $C_2H_5$ | H |  | H | Cl | H | 556.5 | >300 |
| 20 | S | S | $C_2H_5$ | $(CH_2)_3-SO_3^-$ | H |  | H | $CH_3$ | H | 555.5 | 274 |
| 21 | S | S | $(CH_2)_3-SO_3^-$ | $C_2H_5$ | $CH_3$ |  | H | $OCH_3$ | H | 561.3 | 296 |
| 22 | S | S | $(CH_2)_3-SO_3^-$ | $C_2H_5$ | $CH_3$ |  | H | $CH_3$ | H | 557.5 | 296 |
| 23 | S | S | $(CH_2)_3-SO_3^-$ | $C_2H_5$ | $CH_3$ |  | H | Cl | H | 557.5 | >300 |
| 24 | S | S | $(CH_2)_3-SO_3^-$ | $C_3H_5$ | $CH_3$ |  | H | OH | H | 559 | 240 |
| 25 | S | S | $(CH_2)_3-SO_3^-$ | $C_2H_5$ | $CH_3$ |  | H | H | H | 552.5 | 216 |
| 26 | S | S | $(CH_2)_3-SO_3^-$ | $C_3H_5$ | $CH_3$ |  | H | —(CH=CH)$_2$— |  | 566.5 | 279 |
| 27 | S | Se | $(CH_2)_3-SO_3^-$ | $C_2H_5$ | $CH_3$ |  | H | Cl | H | 557.5 | 238 |
| 28 | S | S | $(CH_2)_3-SO_3^-$ | $n$-$C_3H_7$ | $CH_3$ |  | H | Cl | H | 559 | >300 |
| 29 | S | S | $(CH_2)_3-SO_3^-$ | $(CH_2)_3SO_3-HENT_3$ | H |  | H | Cl | H | 552 | 242 |
| 30 | S | S | $(CH_2)_3-SO_3^-$ | $(CH_2)_3-SO_3HNEt_3$ | H |  | H | $CH_3$ | H | 552 | 160 |
| 31 | S | S | $(CH_2)_3-SO_3^-$ | $(CH_2)_3-SO_3HNEt_3$ | $CH_3$ |  | H | $CH_3$ | H | 551.5 | 140 |
| 32 | S | S | $(CH_2)_2-CH-CH_3$ $\mid$ $SO_3$ | $CH_2-CH=CH_2$ | H |  | H | Cl | H | 552.5 | 275 |

NOTE.—PTS designates p-toluenesulfonate.

A typical example of the known sensitizing dye disclosed in U.S. Pat. 2,647,051 is:

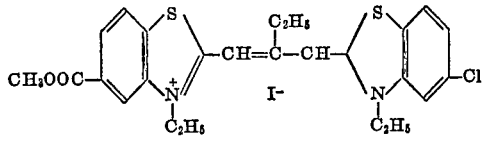

λ Me OH max. 553.5 mμ; M.P. 253° C.

The sensitizing dye of the invention can sensitize spectrally a silver halide photographic emulsion, in particular, enlarging the spectrally sensitive region of a gelatino-silver halide emulsion. Furthermore, the sensitizing dye is capable of sensitizing sufficiently photographic emulsions containing other hydrophilic colloids other than gelatin, for example, agar collodion, water-soluble cellulose derivatives, polyvinyl alcohol and other synthetic and natural hydrophilic resins and also is suitable for use as a sensitizing dye in electrophotography using zinc oxide. For the emulsion of the invention, silver halides such as silver bromide, silver iodobromide, silver chlorobromide or silver chloroiodobromide can be used.

In the preparation of a photographic emulsion sensitized according to the invention, one or more sensitizing dyes can be incorporated in a photographic emulsion in any conventional manner. In practice, a dye is added ordinarily in the form of a solution in a suitable solvent such as methanol, ethanol or the like. The amount of the sensitizing dye added to the emulsion can be varied within a wide range, for example, from 5 to 200 mg. per kg. of the emulsion depending on the effect desired. The photographic emulsion of the invention further can be subjected to hypersensitization and supersensitization in the conventional manner.

In preparation of the photographic emulsion according to the invention, commonly used additives can be incorporated in an emulsion in the conventional manner. Examples of such additives are sensitizers, stabilizers, color tone regulators, hardeners, surfactants, fog inhibitors, plasticizers, development accelerators, color forming agents and whitening agents.

The photographic emulsion of the invention can be applied to a suitable support such as a glass sheet, a cellulose derivative film, a synthetic resin film or a baryta paper in a conventional manner.

The following examples are to illustrate the invention further without limiting it.

EXAMPLES

To a gelatino-silver iodobromide emulsion (AgI:AgBr=7 mols:93 mols)

was added the sensitizing dye of the invention, described above, to prepare a silver halide photographic emulsion. The resulting emulsion was coated onto a cellulose triacetate film base, dried, exposed to a sunlight color of 64 luxes corresponding to 5400° K. through a Fuji No. 7 Filter (red filter transmitting longer wavelength light than 580 mμ, made by Fuji Photo Film Co.) and developed with the following composition:

TABLE 2

| | G. |
|---|---|
| Metol | 2 |
| Sodium sulfite | 100 |
| Hydroquinone | 5 |
| Borax | 2 |
| Water to 1000 ml. | |

In Table 3 are shown the red sensitivity and sensitization maximum when adding the sensitizing dye of Table 1. In Table 4, the red sensitivity of the typical sensitizing dye is compared with that of a comparison dye. As is apparent from Table 4, the sensitizing dyes used in the invention are better in red sensitivity than the known red sensitive dyes used for comparison, for example, sensitizing dyes K, L, M, N, O, P and Q.

TABLE 3

| Sensitizing dye | Mg./mol kg. emulsion | Kind of emulsion | Sensitization maximum (mμ) | Red sensitivity |
|---|---|---|---|---|
| 1 | 0.08 | AgBr/I | 650 | 530 |
| 2 | 0.08 | AgBr/I | 648 | 710 |
| 3 | 0.08 | AgBr/I | 653 | 340 |
| 4 | 0.08 | AgBr/I | 650 | 635 |
| 5 | 0.04 | AgBr/I | 646 | 390 |
| 6 | 0.04 | AgBr/I | 650 | 440 |
| 7 | 0.08 | AgBr/I | 643 | 400 |
| 8 | 0.08 | AgBr/I | 646 | 450 |
| 9 | 0.04 | AgBr/I | 662 | 550 |
| 10 | 0.08 | AgBr/I | 656 | 360 |
| 11 | 0.04 | AgBr/I | 650 | 450 |
| 12 | 0.04 | AgBr/I | 652 | 550 |
| 13 | 0.06 | AgBr/I | 652 | 420 |
| 14 | 0.08 | AgBr/I | 652 | 410 |
| 15 | 0.06 | AgBr/I | 670 | 450 |
| 16 | 0.08 | AgBr/I | 672 | 510 |
| 17 | 0.06 | AgBr/I | 675 | 570 |
| 18 | 0.06 | AgBr/I | 652 | 450 |
| 19 | 0.08 | AgBr/I | 652 | 430 |
| 20 | 0.08 | AgBr/I | 647 | 635 |
| 21 | 0.08 | AgBr/I | 650 | 610 |
| 22 | 0.08 | AgBr/I | 647 | 660 |
| 23 | 0.06 | AgBr/I | 653 | 510 |
| 24 | 0.08 | AgBr/I | 650 | 435 |
| 25 | 0.08 | AgBr/I | 643 | 430 |
| 26 | 0.02 | AgBr/I | 658 | 390 |
| 27 | 0.04 | AgBr/I | 645 | 600 |
| 28 | 0.04 | AgBr/I | 654 | 500 |
| 29 | 0.08 | AgBr/I | 655 | 420 |
| 30 | 0.08 | AgBr/I | 652 | 390 |
| 31 | 0.08 | AgBr/I | 644 | 440 |
| 32 | 0.08 | AgBr/I | 656 | 400 |

The red sensitivity in this table is represented by the relative sensitivity to the red sensitivity of the sensitizing dye P of Table 4, equal to 100 when exposed through a Fuji No. 7 Filter (red filter).

TABLE 4

| Sensitizing dye | Mg./mol/kg. emulsion | Kind of emulsion | Red sensitivity |
|---|---|---|---|
| 1 | 0.08 | AgBr/I | 530 |
| 2 | 0.08 | AgBr/I | 710 |
| 4 | 0.08 | AgBr/I | 635 |
| 9 | 0.04 | AgBr/I | 550 |
| K (for comparison) | 0.08 | AgBr/I | 195 |
| L (for comparison) | 0.08 | AgBr/I | 105 |
| M (for comparison) | 0.08 | AgBr/I | 30 |
| 22 | 0.08 | AgBr/I | 660 |
| N (for comparison) | 0.04 | AgBr/I | 280 |
| 21 | 0.08 | AgBr/I | 610 |
| O (for comparison) | 0.04 | AgBr/I | 250 |
| 23 | 0.06 | AgBr/I | 510 |
| P (for comparison) | 0.04 | AgBr/I | 100 |
| 25 | 0.08 | AgBr/I | 430 |
| Q (for comparison) | 0.06 | AgBr/I | 160 |

The red sensitivity in this table is represented by the relative sensitivity to the red sensitivity of the sensitizing dye P of Table 4, equal to 100 when exposed through a Fuji No. 7 Filter (red filter).

The chemical structures of the sensitizing dyes used for comparison purposes are as follows:

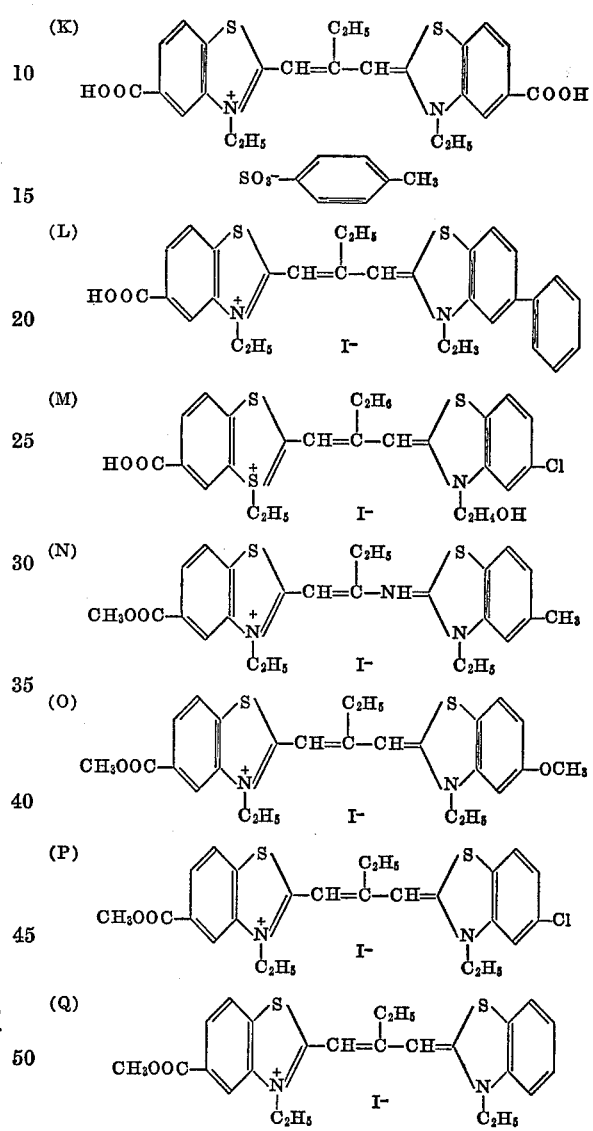

We claim:
1. A sensitizing dye having the following general formula

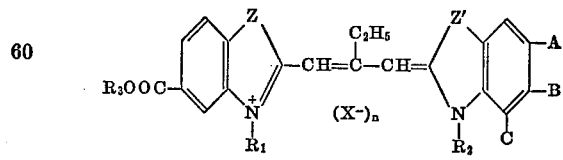

wherein Z and Z' each is selected from the group consisting of a sulfur atom and a selenium atom; wherein R₃ is selected from the group consisting of a hydrogen atom, an alkyl group having from 1 to 4 carbon atoms, wherein A is selected from the group consisting of a hydrogen atom and an alkyl group having from 1 to 4 carbon atoms; wherein C is a hydrogen atom; wherein B is selected from the group consisting of a hydrogen atom, a halogen atom, an alkyl group having from 1 to 4 carbon atoms, an alkoxyl group and a hydroxyl group, providing that when A is a hydrogen atom and C is a hydrogen atom, B is selected from the group consisting of a hydrogen atom, a halogen atom, an alkyl group having from 1 to 4 carbon atoms, an alkoxy group and a hydroxy group and when A is an alkyl group and C is a hydrogen atom, B is selected from the group consisting of said alkyl group, an alkoxy group and a hydroxy group; wherein B and C may combine to form a benzene nucleus; wherein $R_1$ and $R_2$ each is selected from the group consisting of an ethyl, an n-propyl, a vinylmethyl, a γ-sulfopropyl, a γ-sulfobutyl and a δ-sulfobutyl group; wherein at least one of $R_1$ and $R_2$ is selected from the group consisting of a γ-sulfopropyl, a γ-sulfobutyl, and a δ-sulfobutyl group when $R_3$ is a lower alkyl group; wherein X is a negatively charged anion; and wherein $n$ is 0 or 1.

References Cited
UNITED STATES PATENTS

| | | | |
|---|---|---|---|
| 2,609,371 | 9/1952 | Firestine | 260—240.65 |
| 2,647,050 | 7/1953 | Firestine | 260—240.65 |
| 2,647,051 | 7/1953 | Vinton et al. | 260—240.6 X |

OTHER REFERENCES

Conant, The Chemistry of Organic Compounds, revised edition 1939, third printing, January 1943, pp. 98 to 99, The Macmillan Co.

JOHN D. RANDOLPH, Primary Examiner

U.S. Cl. X.R.

96—137; 260—240.65